US008539836B2

(12) United States Patent
McNeil

(10) Patent No.: US 8,539,836 B2
(45) Date of Patent: Sep. 24, 2013

(54) MEMS SENSOR WITH DUAL PROOF MASSES

(75) Inventor: Andrew C. McNeil, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 307 days.

(21) Appl. No.: 13/012,671

(22) Filed: Jan. 24, 2011

(65) Prior Publication Data

US 2012/0186347 A1 Jul. 26, 2012

(51) Int. Cl.
*G01P 15/125* (2006.01)

(52) U.S. Cl.
USPC ........................................ 73/514.32

(58) Field of Classification Search
USPC ............... 73/514.32, 514.38, 514.36, 514.29, 73/504.12, 504.04, 510
See application file for complete search history.

(56) References Cited

U.S. PATENT DOCUMENTS

| 5,331,853 | A | 7/1994 | Hulsing, II | |
|---|---|---|---|---|
| 6,651,500 | B2 | 11/2003 | Stewart et al. | |
| 2007/0000323 | A1* | 1/2007 | Kuisma | 73/514.32 |
| 2008/0110260 | A1* | 5/2008 | Konno et al. | 73/514.32 |
| 2009/0139331 | A1 | 6/2009 | Axelrod et al. | |
| 2010/0011860 | A1* | 1/2010 | Offenberg et al. | 73/514.32 |
| 2010/0107763 | A1* | 5/2010 | Lin et al. | 73/514.32 |
| 2010/0122579 | A1* | 5/2010 | Hsu et al. | 73/514.32 |
| 2010/0242603 | A1* | 9/2010 | Miller et al. | 73/514.32 |
| 2010/0313660 | A1* | 12/2010 | Nishikage et al. | 73/514.32 |
| 2011/0023606 | A1* | 2/2011 | Burghardt et al. | 73/514.32 |
| 2011/0056295 | A1* | 3/2011 | Classen | 73/514.32 |
| 2011/0154899 | A1* | 6/2011 | Classen et al. | 73/514.32 |
| 2011/0203373 | A1* | 8/2011 | Konno | 73/514.32 |
| 2011/0290023 | A1* | 12/2011 | Takagi | 73/514.32 |
| 2011/0296917 | A1* | 12/2011 | Reinmuth et al. | 73/514.32 |

FOREIGN PATENT DOCUMENTS

| JP | 2010210425 A | 9/2010 |
|---|---|---|
| WO | 9524652 A1 | 9/1995 |
| WO | 2008133183 A1 | 11/2008 |
| WO | 2010055716 A1 | 5/2010 |

OTHER PUBLICATIONS

EP Application 12151623.1-1236, International Search Report and Written Opinion, dated May 23, 2012.

* cited by examiner

*Primary Examiner* — Helen Kwok
(74) *Attorney, Agent, or Firm* — Schmeiser, Olsen & Watts LLP; Lowell W. Gresham; Charlene R. Jacobsen

(57) ABSTRACT

A microelectromechanical systems (MEMS) sensor (20) includes a substrate (26) and suspension anchors (34, 36) formed on a planar surface (28) of the substrate (26). The MEMS sensor (20) further includes a first movable element (38) and a second movable element (40) suspended above the substrate (26). Compliant members (42, 44) interconnect the first movable element (38) with the suspension anchor 34 and compliant members (46, 48) interconnect the second movable element (40) with the suspension anchor (36). The movable elements (38, 40) have an equivalent shape. The movable elements may be generally rectangular movable elements (38, 40) or L-shaped movable elements (108, 110) in a nested configuration. The movable elements (38, 40) are oriented relative to one another in rotational symmetry about a point location (94) on the substrate (26).

14 Claims, 2 Drawing Sheets

$ACCEL(OUT) \propto (C1 + C4) - (C2 + C3)$

WHERE: C1 (M1, S1) — 30
C4 (M2, S2) — 32
C2 (M1, S2) — 32
C3 (M2, S1) — 30

MEMS SENSOR WITH DUAL PROOF MASSES

TECHNICAL FIELD OF THE INVENTION

The present invention relates generally to microelectromechanical systems (MEMS) sensors. More specifically, the present invention relates to a MEMS sensor with dual proof masses arranged for sensor size reduction and reduced sensitivity to temperature induced error.

BACKGROUND OF THE INVENTION

Microelectromechanical Systems (MEMS) sensors are widely used in applications such as automotive, inertial guidance systems, household appliances, protection systems for a variety of devices, and many other industrial, scientific, and engineering systems. Such MEMS sensors are used to sense a physical condition such as acceleration, pressure, or temperature, and to provide an electrical signal representative of the sensed physical condition.

Capacitive-sensing MEMS designs are highly desirable for operation in high acceleration environments and in miniaturized devices, due to their small size and suitability for low cost mass production. Capacitive accelerometers sense a change in electrical capacitance, with respect to acceleration, to vary the output of an energized circuit. One common form of accelerometer is a two layer capacitive transducer having a "teeter-totter" or "see saw" configuration. This commonly utilized transducer type uses a movable element or plate that rotates under z-axis acceleration above a substrate. The accelerometer structure can measure two distinct capacitances to determine differential or relative capacitance.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION

Embodiments described herein include microelectromechanical systems (MEMS) sensors having dual movable elements, i.e. proof masses, suspended above an underlying substrate. The dual movable elements are oriented to minimize measurement errors due to thermally induced stress. In an additional aspect, the dual movable elements may be shaped to optimize substrate area by allowing the dual movable elements to fit together in a nested configuration. Such a MEMS sensor having the dual movable elements can be manufactured using existing MEMS fabrication processes. Thus, such a MEMS sensor achieves design objectives of accuracy, compact size, and cost effective manufacturing.

Figure 1:
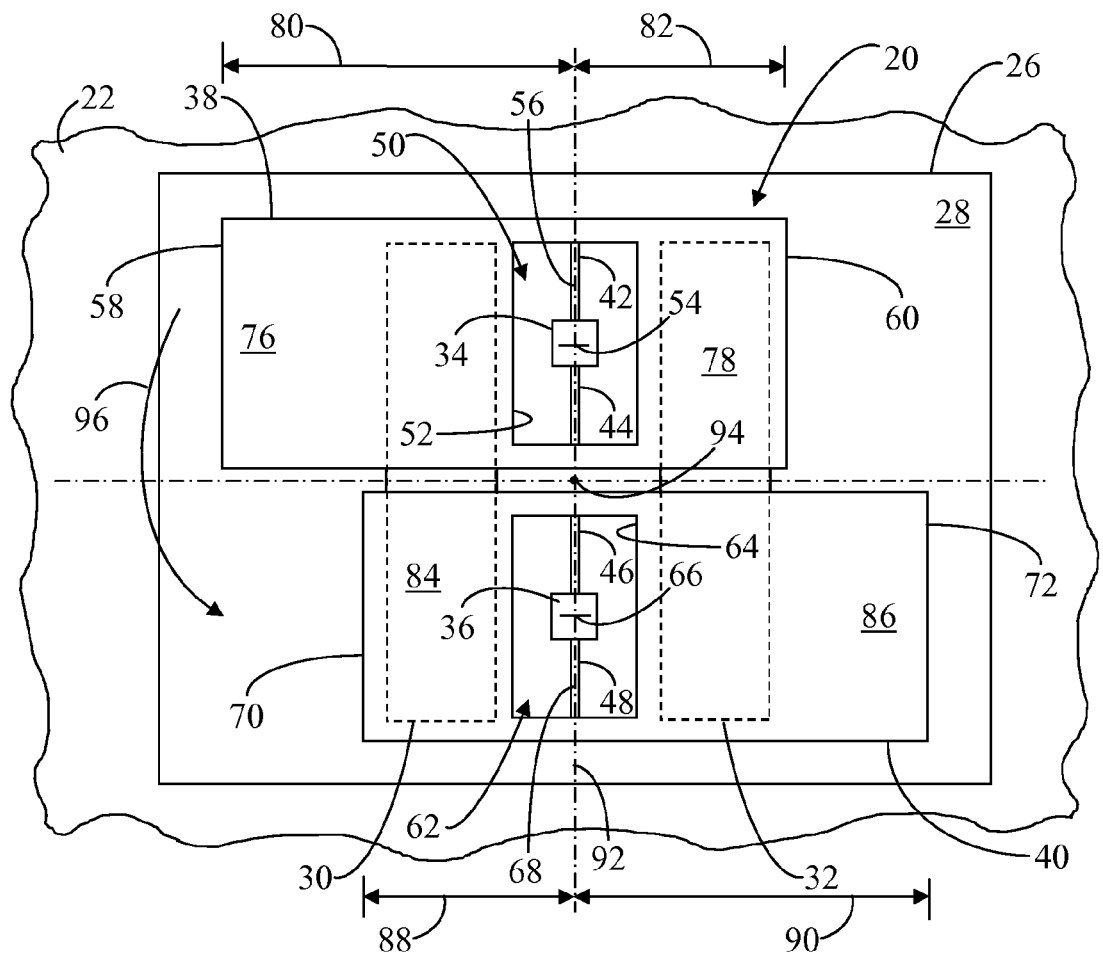
FIG. 1 shows a top view of a MEMS sensor included in a device in accordance with an embodiment.

FIG. 1 shows a top view of a MEMS sensor 20 included in a device 22 in accordance with an embodiment. MEMS sensor 20, in the form of an accelerometer, is adapted to sense z-axis acceleration, represented by an arrow 24 (see FIG. 2), and is constructed as a "teeter-totter" type sensor. Device 22 can include any of a plurality of devices in which acceleration measurements may be needed. These devices include, for example, automotive systems, inertial guidance systems, household appliances, protection systems for a variety of devices, portable computing and telecommunication devices, handheld game controllers, and many other industrial, scientific, and engineering systems.

MEMS sensor 20 includes a substrate 26 having a generally planar surface 28. A first sense element 30 and a second sense element 32 (represented by dashed lines) are formed on planar surface 28 of substrate 26. In addition, a first suspension anchor 34 and a second suspension anchor 36 are formed on planar surface 28 of substrate 26. A first movable element, referred to herein as a first proof mass 38, and a second movable element, referred to herein as a second proof mass 40, are positioned in spaced apart relationship above planar surface 28 of substrate 26.

MEMS sensor 20 includes a first compliant member 42 and a second compliant member 44 interconnecting first proof mass 38 with first suspension anchor 34 so that first proof mass 38 is suspended above substrate 26. Similarly, MEMS sensor 20 includes a third compliant member 46 and a fourth compliant member 48 interconnecting second proof mass 40 with second suspension anchor 36 so that second proof mass 40 is suspended above substrate 26. The components of MEMS sensor 30 may be formed using existing and upcoming MEMS fabrication design rules and processes that include, for example, deposition, patterning, and etching.

The terms "first," "second," "third," and "fourth" used herein do not refer to an ordering or prioritization of elements within a countable series of elements. Rather, the terms "first," "second," "third," and "fourth" are used to distinguish the particular elements for clarity of discussion.

As shown, an opening 50 extends through first proof mass 38 and is delineated by an inner edge portion 52 of first proof mass 38. First suspension anchor 34 is positioned at an approximate center 54 of opening 50 along a first rotational axis 56 of first proof mass 38 between a first end 58 and a second end 60 of first proof mass 38. Likewise, an opening 62 extends through second proof mass 40 and is delineated by an inner edge portion 64 of second proof mass 40. Second suspension anchor 36 is positioned at an approximate center 66 of opening 62 along a second rotational axis 68 of second proof mass 40 between a third end 70 and a fourth end 72 of second proof mass 40.

In order to operate as a teeter-totter type accelerometer, a first section 76 of first proof mass 38 on one side of first rotational axis 56 is formed with relatively greater mass than a second section 78 of first proof mass 38 on the other side of first rotational axis 56. In an exemplary embodiment, the greater mass of first section 76 may be created by offsetting first rotational axis 56 such that a first length 80 of first section 76 between first rotational axis 56 and first end 58 is greater than a second length 82 of second section 78 between first rotational axis 56 and second end 60. Similarly, a third section 84 of second proof mass 40 on one side of second rotational axis 68 is formed with relatively less mass than a fourth section 86 of second proof mass 40 on the other side of second rotational axis 68. The lower mass of third section 84 may be created by offsetting second rotational axis 68 such that a third length 88 of third section 84 between second rotational axis 68 and third end 70 is less than a fourth length 90 of fourth section 86 between second rotational axis 68 and fourth end 72. Each of first and second proof masses 38 and 40 is adapted for rotation about its corresponding one of first and second rotational axes 56 and 68 in response to acceleration 24 (FIG. 2), thus changing its position relative to the underlying sensing elements 30 and 32.

First and second proof masses 38 and 40, respectively, have a substantially equivalent (i.e., the same) shape and size. In the illustrated embodiment of FIG. 1, the shape is generally rectangular. Additionally, first length 80 of first section 76 is substantially equivalent to fourth length 90 of fourth section 86, and second length 82 of second section 78 is substantially equivalent to third length 88 of third section 84. It should also be observed that first and second axes of rotation 56 and 68, respectively, are aligned with one another along a common axis of rotation 92.

MEMS sensor applications are calling for lower temperature coefficient of offset (TCO) specifications. TCO is a measure of how much thermal stresses effect the performance of a semiconductor device, such as a MEMS sensor. A high TCO indicates correspondingly high thermally induced stress, or a MEMS device that is very sensitive to such a stress. The packaging of MEMS sensor applications often uses materials with dissimilar coefficients of thermal expansion. Thus, an undesirably high TCO can develop during manufacture or operation. In addition, stresses can result from soldering the packaged semiconductor device onto a printed circuit board in an end application. The combination of stresses and the material properties of the MEMS device can result in strain, i.e., deformation, in substrate 26. First and second suspension anchors 30 and 32 can also experience this strain, or deformation, via the underlying substrate 26. The strain in suspension anchors 30 and 32 can cause some rotation of first and second proof masses 38 and 40 about their respective first and second rotational axes 56 and 68 resulting in measurement inaccuracies, thus adversely affecting the output capacitive MEMS sensor 20.

Per convention, elements in a MEMS sensor are typically arranged according to the principle of reflection symmetry in which the elements are arranged relative to an axis of symmetry. An axis of symmetry is a line in a geometric figure which divides the figure into two parts such that one part, when folded over along the axis of symmetry, coincides with the other part. Unfortunately, a hypothetical arrangement of a pair of proof masses in reflection symmetry could lead to undesirably high strain and measurement inaccuracies due to the TCO effect.

Accordingly, first and second proof masses 38 and 40 are not arranged in accordance with reflection symmetry. Rather, second proof mass 40 is generally oriented in rotational symmetry relative to first proof mass 38 about a point location 94 on planar surface 28 of substrate 26 in order to counteract the problem of strain at first and second suspension anchors 34 and 36 causing measurement inaccuracies. The term "rotational symmetry" utilized herein refers to an arrangement in which second proof mass 40 is rotated about point location 94 relative to first proof mass 38, but "still looks the same" as first proof mass 38. That is, every point on first proof mass 38 has a matching point on second proof mass 40 that is the same distance from point location 94, but in the opposite direction. This rotational symmetry is represented in FIG. 1 by an arrow 96. In an embodiment, second proof mass 40 is located in an orientation that is rotated about point location 94 on substrate 26 approximately one hundred and eighty degrees relative to first proof mass 38. This configuration of rotational symmetry is sometimes referred to as "second degree rotational symmetry."

Accordingly, it is the rotationally symmetric arrangement of first and second proof masses 38 and 40, respectively, that results in first and second axes of rotation 56 and 68, respectively, being aligned with one another along common axis of rotation 92. Thus, any strain experienced through first suspension anchor 34 causing rotation of first proof mass 38 is balanced by a generally equal and opposite strain experienced through second suspension anchor 36 causing rotation of second proof mass 40. In addition, the rotationally symmetric arrangement of first and second proof masses 38 and 40 enables close placement of sense elements 30 and 32 to one another. This close proximity results in sense element 30 and 32 having similar deformation due to strain.

Figure 2:
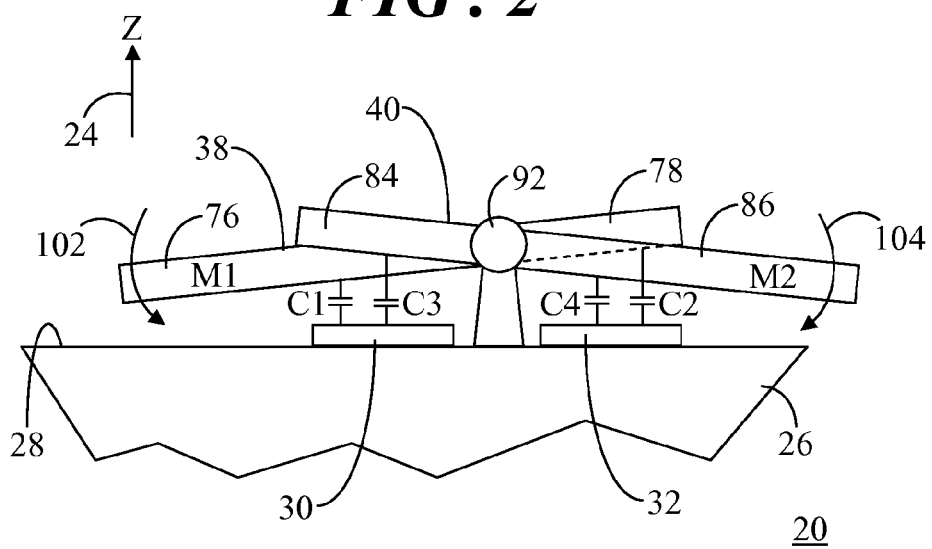
FIG. 2 shows a stylized side view of the MEMS sensor of FIG. 1.
Figures 3, 4:
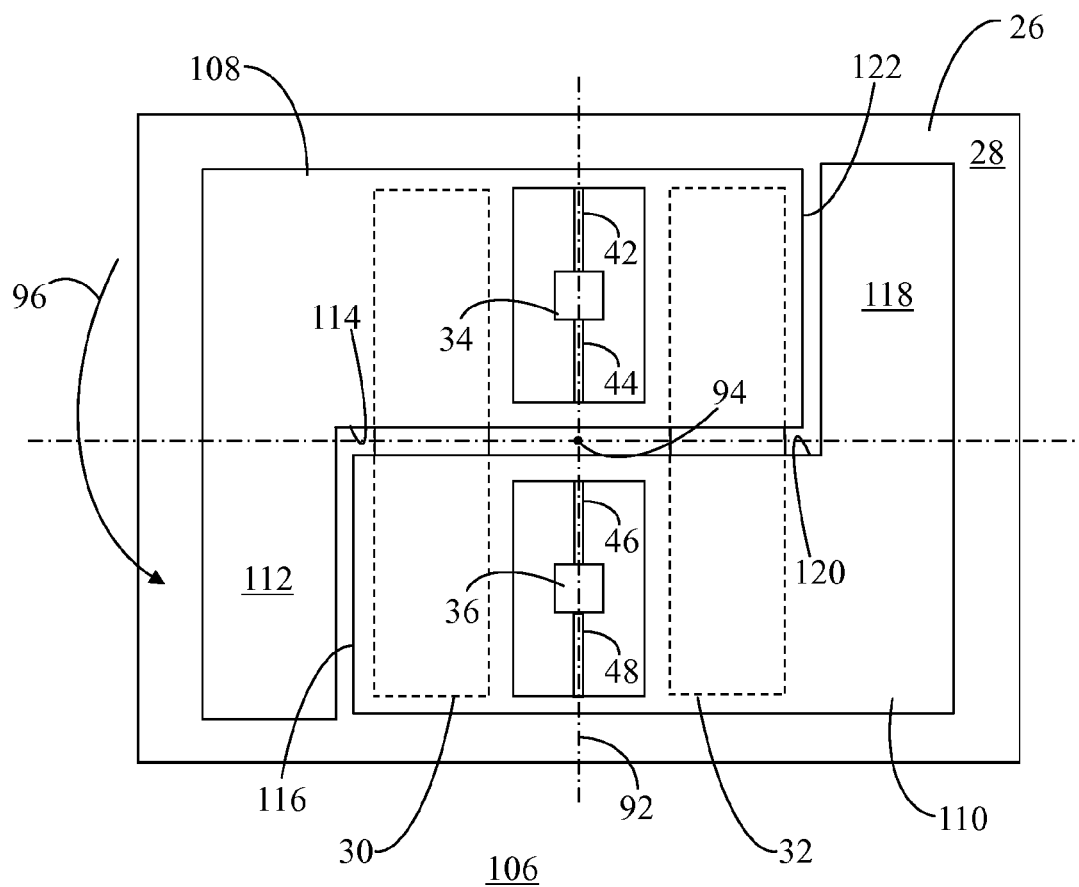
FIG. 3 shows a chart of an equation of differential capacitance produced by the MEMS sensor of FIG. 1.
FIG. 4 shows a top view of a MEMS sensor in accordance with an alternative embodiment.

Referring to FIGS. 2-3, FIG. 2 shows a stylized side view of MEMS sensor 20, and FIG. 3 shows a chart 98 of an equation 100 of differential capacitance produced by MEMS sensor 20. In FIGS. 2 and 3, the nomenclature "M1" represents first proof mass 38, "M2" represents second proof mass 40, "S1" represents first sense element 30, and "S2" represents second sense element 32.

FIG. 2 represents the rotation of first and second proof masses 38 and 40, respectively, about common axis 92 of rotation. In response to z-axis acceleration 24, first proof mass 38 rotates in a first direction, represented by an arrow 102, and second proof mass 40 rotates in a second direction, represented by an arrow 104. However, second direction 104 of rotation is opposite first direction 102 of rotation due to the rotational symmetry of first and second proof masses 38 and 40.

As first and second proof masses 38 and 40 rotate, their positions change relative to the underlying sensing elements 30 and 32. This change in position results in a set of capacitances whose difference, i.e., a differential capacitance, is indicative of acceleration 24. As shown in FIG. 2, a first capacitance, C1, is formed between first section 76 of first proof mass 38 and first sense element 30. A second capacitance, C2, is formed between second section 78 of first proof mass 38 and second sense element 32. Additionally, a third capacitance, C3, is formed between third section 84 of second proof mass 40 and first sense element 30. And, a fourth capacitance, C4, is formed between fourth section 86 of second proof mass 40 and second sense element 32.

FIG. 3 represents the differential capacitance indicative of acceleration 24. In particular, acceleration equation 100 shows that the acceleration output, ACCEL(OUT), is proportional to the difference between the sum of first and fourth capacitances (C1 and C4) and the sum of second and third capacitances (C2 and C3). Chart 98 further illustrates the configuration in which the first capacitance, C1, is formed between first proof mass 38, M1, and first sense element 30, S1. The fourth capacitance, C4, is formed between second proof mass 40, M2, and second sense element 32, S2. The second capacitance, C2, is formed between first proof mass 38, M1, and second sense element 32, S2. And the third capacitance, C3, is formed between second proof mass 40, M2, and first sense element 30, S1.

The dual proof mass configuration of MEMS sensor 20 thus yields a relatively high acceleration output in a small package that is well suited for low cost mass production. Furthermore, the rotationally symmetric configuration of first and second proof masses 38 and 40 results in at least partial cancellation of measurement error due to thermally induced stress, also known as TCO.

FIG. 4 shows a top view of a MEMS sensor 106 in accordance with an alternative embodiment. A brief review of MEMS sensor 20 (FIG. 1) reveals that there are significant areas of unused space overlying substrate 26 due to the rotationally symmetric configuration of first and second proof masses 38 and 40. In particular, a region overlying substrate 26 proximate second end 60 of first proof mass 38 and another region overlying substrate 26 proximate third end 70 of second proof mass 40 are unused. The configuration of MEMS sensor 106 capitalizes on this unused space through a nested arrangement of L-shaped movable masses to achieve higher sensitivity to z-axis acceleration 24 (FIG. 2).

Many components of MEMS sensor 106 are generally equivalent to the components of MEMS sensor 20 (FIG. 1). For simplicity, the same reference numerals are used herein for the equivalent components. As such, MEMS sensor 106 includes substrate 26, with first sense element 30, second sense element 32, first suspension anchor 34, and second suspension anchor 36 formed on planar surface 28 of substrate 26.

MEMS sensor 106 further includes a first movable element, referred to herein as a first proof mass 108, and a second movable element, referred to herein as a second proof mass 110, positioned in spaced apart relationship above planar surface 28 of substrate 26. First and second compliant members 42 and 44, respectively, interconnect first proof mass 108 with first suspension anchor 34 so that first proof mass 108 is suspended above substrate 26. Likewise, third and a fourth compliant members 46 and 48, respectively, interconnect second proof mass 110 with second suspension anchor 36 so that second proof mass 110 is suspended above substrate 26.

In contrast to the generally rectangular shape of first and second proof masses 38 and 40 (FIG. 1), first and second proof masses 108 and 110 of MEMS sensor 106 are L-shaped elements. That is, first proof mass 108 includes a first lateral extension section 112 extending from a first side 114 of first proof mass 108 and residing proximate an end 116 of second proof mass 110. Likewise, second proof mass 110 includes a second lateral extension section 118 extending from a second side 120 of second proof mass 110 and residing proximate an end 122 of first proof mass 108.

Second L-shaped proof mass 110 is generally oriented in rotational symmetry 96 relative to first L-shaped proof mass 108 about point location 94 on planar surface 28 of substrate 26 to achieve a nested configuration in which first and second proof masses 108 and 110 fit together without being in contact with one another. The formerly unused regions overlying substrate 26 are now utilized to further increase the mass of opposing sections of first and second proof masses 108 and 110. This increased mass can provide higher sensitivity to Z-axis acceleration 24 (FIG. 1) using the same area as MEMS sensor 20 (FIG. 1). In addition, the rotationally symmetric configuration of first and second proof masses 108 and 110 results in at least partial cancellation of measurement error due to thermally induced stress.

Embodiments described herein comprise microelectromechanical systems (MEMS) sensors having dual movable elements, i.e. proof masses, suspended above an underlying substrate. The dual proof masses are oriented in rotational symmetry relative to one another to minimize measurement errors due to thermally induced stress. In an additional aspect, dual proof masses oriented in rotational symmetry relative to one another may be L-shaped to optimize substrate area by allowing the dual proof masses to fit together in a nested configuration. The L-shaped dual proof masses can provide higher sensitivity to Z-axis acceleration using the same area as a MEMS sensor having dual generally rectangular proof mass MEMS sensor. The MEMS sensors having dual proof masses can be manufactured using existing MEMS fabrication processes. Thus, such a MEMS sensor achieves design objectives of high sensitivity, accuracy, compact size, and cost effective manufacturing.

Although the preferred embodiments of the invention have been illustrated and described in detail, it will be readily apparent to those skilled in the art that various modifications may be made therein without departing from the spirit of the invention or from the scope of the appended claims. For example, the dual proof masses may have different shapes than those described above, as long as they are arranged rotationally symmetric relative to one another.

What is claimed is:

1. A microelectromechanical systems (MEMS) sensor comprising:
   a substrate;
   a first movable element positioned in spaced apart relationship above a generally planar surface of said substrate, said first movable element being adapted for rotational motion in a first direction in response to acceleration along an axis perpendicular to said planar surface of said substrate, said rotational motion occurring about a first rotational axis positioned between first and second ends of said first movable element; and
   a second movable element positioned in spaced apart relationship above said surface of said substrate, said second movable element being adapted for rotational motion in a second direction in response to said acceleration, said rotational motion occurring about a second rotational axis positioned between third and fourth ends of said second movable element, said second direction being opposite to said first direction, said first and second movable elements having a substantially equivalent shape and said second movable element being generally oriented in rotational symmetry relative to said first movable element about a point location on said planar surface of said substrate such that said first and second movable elements are disposed beside one another along a direction of a common rotational axis, and said first and second rotational axes extend along said common rotational axis, wherein:
   said first movable element includes a first section between said first rotational axis and said first end and a second section between said first rotational axis and said second end, said first rotational axis being offset between said first and second ends such that a first length of said first section between said first rotational axis and said first end is greater than a second length of said second section between said first rotational axis and said second end; and
   said second movable element includes a third section between said second rotational axis and said third end and a fourth section between said second rotational axis and said fourth end, said second rotational axis being offset between said third and fourth ends such that a third length of said third section between said second rotational axis and said third end is less than a fourth length of said fourth section between said second rotational axis and said fourth end.

2. A MEMS sensor as claimed in claim 1 wherein said second movable element is located in an orientation that is rotated about said point location approximately one hundred and eighty degrees relative to said first movable element.

3. A MEMS sensor as claimed in claim 1 further comprising:
   a first suspension anchor formed on said planar surface of said substrate and approximately centered on said common rotational axis;
   a first pair of compliant members interconnecting said first movable element with said first suspension anchor, said first pair of compliant members enabling said rotational motion of said first movable element about said first rotational axis;

a second suspension anchor formed on said surface of said substrate and approximately centered on said common rotational axis; and a second pair of compliant members interconnecting said second movable element with said second suspension anchor, said second pair of compliant members enabling said rotational motion of said second movable element about said second rotational axis.

4. A MEMS sensor as claimed in claim 1 wherein:

said first length is substantially equivalent to said fourth length; and said second length is substantially equivalent to said third length.

5. A MEMS sensor as claimed in claim 1 wherein:

said first movable element includes a first lateral extension section extending from a first side of said first section, said first lateral extension section being located proximate said third end of said second movable element; and said second movable element includes a second lateral extension section extending from a second side of said fourth section, said second lateral extension section being located proximate said second end of said first movable element.

6. A MEMS sensor as claimed in claim 5 wherein:

said first movable element including said first lateral extension section forms a first L-shaped movable element; and said second movable element including said second lateral extension section forms a second L-shaped movable element, said first and second L-shaped movable elements being arranged in a nested configuration without contact between said first and second L-shaped movable elements.

7. A MEMS sensor as claimed in claim 1 further comprising:

a first sensing element disposed on said substrate beneath each of said first and second movable elements; and a second sensing element disposed on said substrate beneath said each of said first and second movable elements, each of said first and second sensing elements being displaced away from and on opposite sides of said common rotational axis by a substantially equivalent distance, and said first and second sensing elements being adapted to detect movement of said first and second movable elements about said common rotational axis along an axis perpendicular to said planar surface of said substrate.

8. A device comprising:

a microelectromechanical systems (MEMS) sensor, said MEMS sensor comprising:

a substrate;

a first movable element positioned in spaced apart relationship above a generally planar surface of said substrate and adapted for rotational motion about a first rotational axis positioned between first and second ends of said first movable element; and a second movable element positioned in spaced apart relationship above said surface of said substrate and adapted for rotational motion about a second rotational axis positioned between third and fourth ends of said second movable element, said first and second rotational axes extending alone a common rotational axis, said first and second movable elements having a substantially equivalent shape and said second movable element being generally oriented in rotational symmetry relative to said first movable element about a point location on said planar surface of said substrate such that said first and second movable elements are disposed beside one another along a direction of said common rotational axis, said second movable element being located in an orientation that is rotated about said point location approximately one hundred and eighty degrees relative to said first movable element, wherein:

said first movable element includes a first section between said first rotational axis and said first end and a second section between said first rotational axis and said second end, said first rotational axis being offset between said first and second ends such that a first length of said first section between said first rotational axis and said first end is greater than a second length of said second section between said first rotational axis and said second end; and said second movable element includes a third section between said second rotational axis and said third end and a fourth section between said second rotational axis and said fourth end, said second rotational axis being offset between said third and fourth ends such that a third length of said third section between said second rotational axis and said third end is less than a fourth length of said fourth section between said second rotational axis and said fourth end.

9. A device as claimed in claim 8 wherein:

said first movable element is adapted for said rotational motion about said first rotational axis in a first direction in response to acceleration along an axis perpendicular to said planar surface of said substrate; and said second movable element is adapted for said rotational motion about said second rotational axis in a second direction in response to said acceleration, said second direction being opposite to said first direction.

10. A device as claimed in claim 8 wherein:

said first movable element includes a first lateral extension section extending from a first side of said first section, said first lateral extension section being located proximate said third end of said second movable element; and said second movable element includes a second lateral extension section extending from a second side of said fourth section, said second lateral extension section being located proximate said second end of said first movable element.

11. A device as claimed in claim 8 further comprising:

a first sensing element disposed on said substrate beneath each of said first and second movable elements; and a second sensing element disposed on said substrate beneath said each of said first and second movable elements, each of said first and second sensing elements being displaced away from and on opposite sides of said common rotational axis by a substantially equivalent distance, and said first and second sensing elements being adapted to detect movement of said first and second movable elements about said common rotational axis along an axis perpendicular to said planar surface of said substrate.

12. A microelectromechanical systems (MEMS) sensor comprising:

a substrate;

a first movable element positioned in spaced apart relationship above a generally planar surface of said substrate;

a second movable element positioned in spaced apart relationship above said surface of said substrate, said first and second movable elements having a substantially equivalent shape and said second movable element being generally oriented in rotational symmetry relative to said first movable element about a point location on said planar surface of said substrate such that said first and second movable elements are disposed beside one another along a direction of a common rotational axis, and said first and second rotational axes extend along said common rotational axis, said second movable element being located in an orientation that is rotated about said point location approximately one hundred and eighty degrees relative to said first movable element, each of said first and second movable elements being adapted for rotational motion about said common rotational axis;
a first sensing element disposed on said substrate beneath each of said first and second movable elements; and
a second sensing element disposed on said substrate beneath said each of said first and second movable elements, each of said first and second sensing elements being displaced away from and on opposite sides of said common rotational axis by a substantially equivalent distance, and said first and second sensing elements being adapted to detect movement of said first and second movable elements about said common rotational axis along an axis perpendicular to said planar surface of said substrate, wherein:
said first movable element includes first and second ends, a first section between said common rotational axis and said first end, and a second section between said common rotational axis and said second end, wherein a first length of said first section between said common rotational axis and said first end is greater than a second length of said second section between said common rotational axis and said second end; and
said second movable element includes third and fourth ends, a third section between said common rotational axis and said third end, and a fourth section between said common rotational axis and said fourth end, wherein a third length of said third section between said common rotational axis and said third end is less than a fourth length of said fourth section between said common rotational axis and said fourth end.

13. A MEMS sensor as claimed in claim 12 further comprising:
a first suspension anchor formed on said planar surface of said substrate and approximately centered on said common rotational axis;
a first pair of compliant members interconnecting said first movable element with said first suspension anchor, said first pair of compliant members enabling said rotational motion of said first movable element;
a second suspension anchor formed on said planar surface of said substrate and approximately centered on said common rotational axis; and
a second pair of compliant members interconnecting said second movable element with said second suspension anchor, said second pair of compliant members enabling said rotational motion of said second movable element.

14. A MEMS sensor as claimed in claim 12 wherein:
said first movable element includes a first lateral extension section extending from a first side of said first section, said first lateral extension section being located proximate said third end of said second movable element; and
said second movable element includes a second lateral extension section extending from a second side of said fourth section, said second lateral extension section being located proximate said second end of said first movable element such that said first and second movable elements are arranged in a nested configuration without contact between said first and second movable elements.

* * * * *